United States Patent [19]

Heckelsberg

[11] E

Patent Number: Re. 33,566

[45] **Reissued Date of Patent: * Apr. 9, 1991**

[54] ROOFING STRUCTURE

[75] Inventor: Robert E. Heckelsberg, Germantown, Tenn.

[73] Assignee: AMCA International Corporation, Hanover, N.H.

[ * ] Notice: The portion of the term of this patent subsequent to Mar. 18, 1997 has been disclaimed.

[21] Appl. No.: 342,162

[22] Filed: Jan. 25, 1982

Related U.S. Patent Documents

Reissue of:

[64] Patent No.: 4,296,581
Issued: Oct. 27, 1981
Appl. No.: 62,300
Filed: Jul. 31, 1979

[51] Int. Cl.[5] ..... E04D 1/34

[52] U.S. Cl. ..... 52/520; 52/528; 52/544

[58] Field of Search ..... 52/520, 528, 404, 407, 52/544, 545, 547, 712, 713, 715, 743, 748, 478, 410

[56] References Cited

U.S. PATENT DOCUMENTS

| | | | |
|---|---|---|---|
| 214,027 | 4/1879 | Currier . | |
| 219,954 | 9/1879 | Jones et al. . | |
| 297,530 | 4/1884 | Mott . | |
| 319,921 | 6/1885 | Montross . | |
| 331,655 | 12/1885 | Rockwell . | |
| 372,589 | 11/1887 | Andrews . | |
| 412,043 | 10/1889 | Sagendorph . | |
| 462,374 | 11/1891 | Couch . | |
| 483,966 | 10/1892 | Montross . | |
| 731,264 | 6/1903 | Armstrong et al. . | |
| 1,143,266 | 6/1915 | Hamilton . | |
| 1,232,196 | 7/1917 | Brague . | |
| 1,259,528 | 3/1918 | Kurz . | |
| 1,292,960 | 1/1919 | Owens . | |
| 1,406,980 | 2/1922 | Crawford . | |
| 1,558,410 | 10/1925 | Strong | 52/520 |
| 1,882,105 | 10/1939 | Wender | 52/520 |
| 1,968,798 | 7/1934 | Cherry . | |
| 2,047,655 | 7/1936 | Von Forster . | |
| 2,140,887 | 12/1938 | Tinnerman . | |
| 2,178,415 | 10/1939 | Ansel . | |
| 2,240,487 | 5/1941 | Benham . | |
| 2,313,345 | 3/1943 | Jones | 52/406 |
| 2,364,528 | 12/1944 | Heinrich . | |
| 2,685,852 | 8/1954 | Goedel . | |
| 2,989,157 | 6/1961 | Mostoller | 52/404 |

(List continued on next page.)

FOREIGN PATENT DOCUMENTS

| | | | |
|---|---|---|---|
| 706575 | 3/1965 | Canada | 52/544 |
| 2348684 | 4/1974 | Fed. Rep. of Germany | 52/712 |

*Primary Examiner*—Carl D. Friedman
*Attorney, Agent, or Firm*—Harness, Dickey & Pierce

[57] ABSTRACT

A roof structure and its components comprises a series of metal panels having flanges that interlock when the panels are laid side by side and which are subsequently tightly seamed together to convert the individual panels into an integrated roof forming membrane. The roof structure may be insulated through the use of a blanket vapor barrier and insulation under the panels preferably along with thermal blocks located over the purlins. The roof structure includes unique flexible panel mounting clips that attach the panels to the purlins in such a way as to permit the panels to expand or contract in response to temperature and pressure changes, thereby minimizing roof stressing.

* * * * *

The questions raised in reexamination request No. 90/000,345, filed 03/18/83, have been considered and the results thereof are reflected in this reissue patent which constitutes the reexamination certificate required by 35 U.S.C. 307 as provided in 37 CFR 1.570(e).

3 Claims, 4 Drawing Sheets

U.S. PATENT DOCUMENTS

| | | | |
|---|---|---|---|
| 3,047,111 | 7/1962 | Clements et al. . | |
| 3,157,965 | 11/1964 | Watson . | |
| 3,209,503 | 10/1965 | Mostoller . | |
| 3,253,376 | 5/1966 | Strauss . | |
| 3,258,887 | 7/1966 | Mostoller . | |
| 3,335,530 | 8/1967 | Hurd . | |
| 3,388,518 | 6/1968 | Scott . | |
| 3,481,094 | 12/1969 | Taylor . | |
| 3,511,011 | 5/1970 | Straus . | |
| 3,513,614 | 5/1970 | Studzmski | 52/404 |
| 3,559,359 | 2/1971 | Talbert . | |
| 3,608,267 | 9/1971 | Curran . | |
| 3,853,227 | 12/1974 | Filipowski . | |
| 3,858,373 | 1/1975 | Day et al. . | |
| 3,889,437 | 6/1975 | Day et al. | 52/528 X |
| 3,898,783 | 8/1975 | Matlock et al. | 52/520 |
| 3,967,430 | 7/1976 | Knudson | 52/748 |
| 3,982,373 | 9/1976 | Wilson et al. | 52/528 |
| 3,998,019 | 12/1976 | Reinwall, Jr. | 52/545 |
| 4,034,532 | 7/1977 | Reinwall, Jr. | 52/520 |
| 4,058,949 | 11/1977 | Bellem | 52/407 |
| 4,193,247 | 3/1980 | Heckelsberg | 52/713 |
| 4,224,775 | 9/1980 | Heckelsberg | 52/528 |

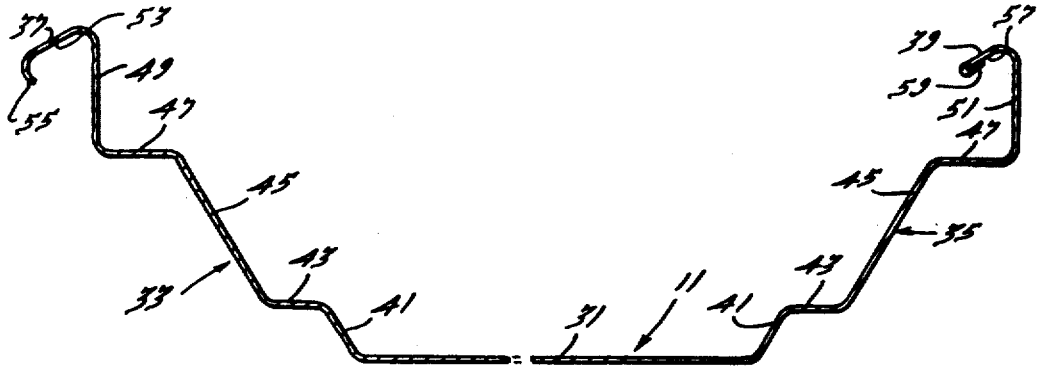
FIG. 4.
FIG. 5.
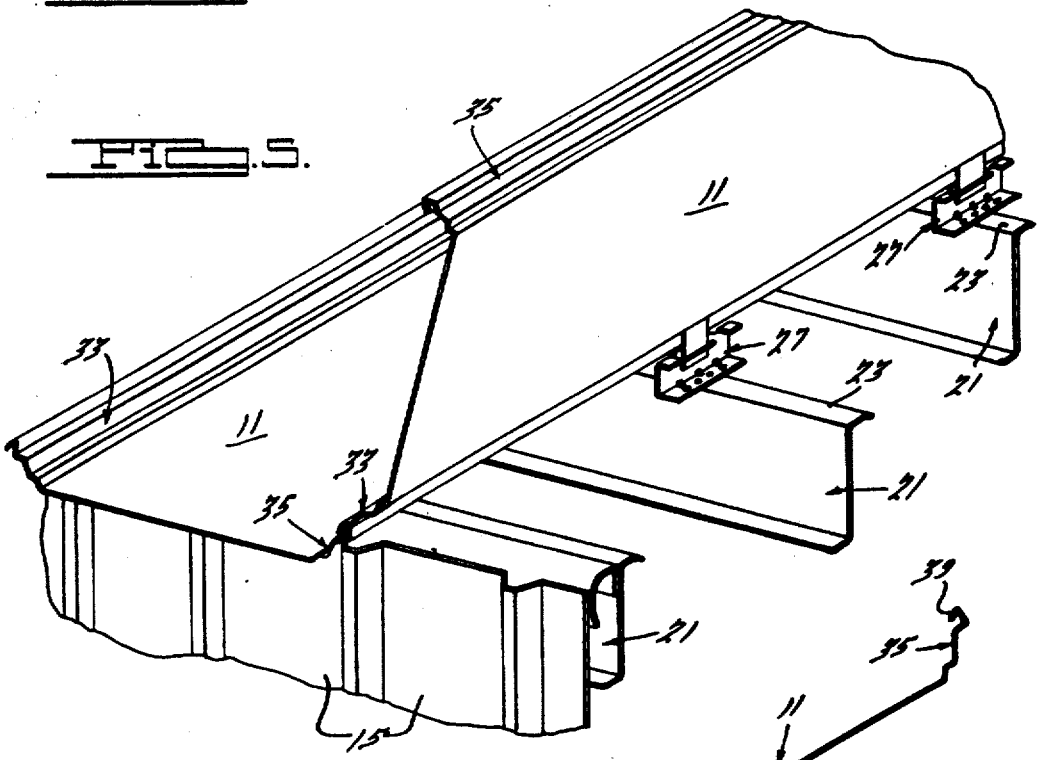
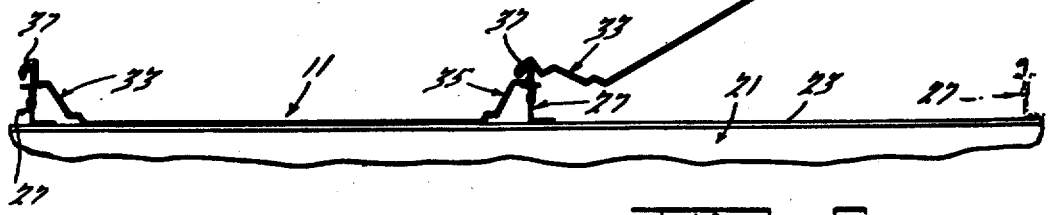
FIG. 6.

FIG. 15.
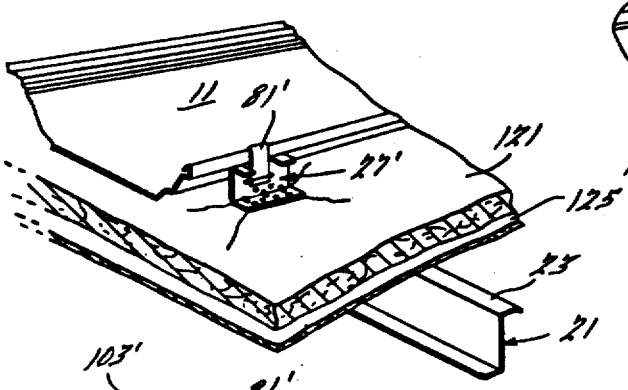
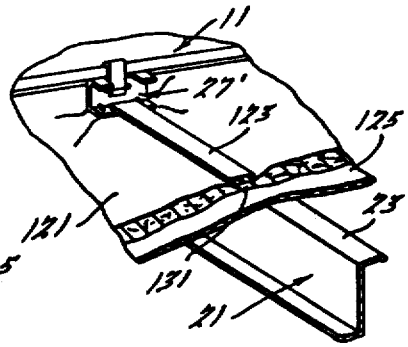
FIG. 16.
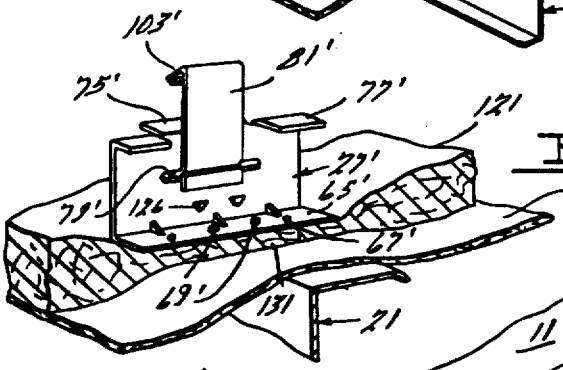
FIG. 17.
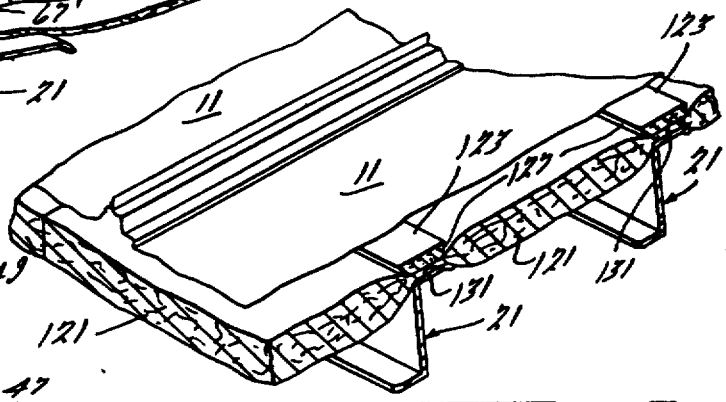
FIG. 18.
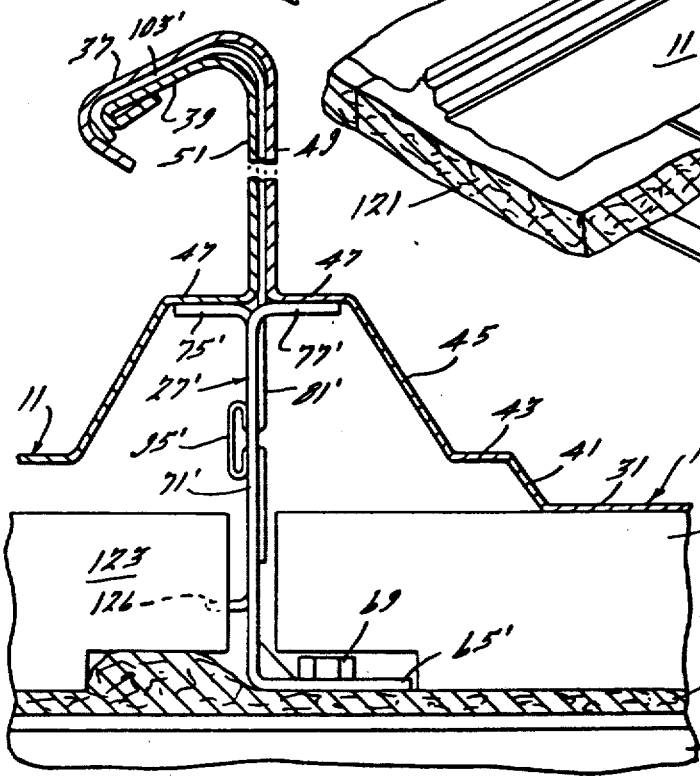
FIG. 19.

ROOFING STRUCTURE

Matter enclosed in heavy brackets [ ] appears in the original patent but forms no part of this reissue specification; matter printed in italics indicates the additions made by reissue.

REFERENCE TO PRIOR COPENDING APPLICATION

This application is a continuation in part of application Ser. No. 875,524, filed Feb. 6, 1978 now U.S. Pat. No. 4,213,282 granted July 22, 1980. The structural changes introduced in the present disclosure are of a minor nature, do not form a part of the claimed subject matter, and have been shown herein merely in order to comply with the statutory requirement to disclose the best known mode of carrying out the invention. Reference is also made to copending application Ser. No. 875,533, now U.S. Pat. No. 4,193,247 granted Mar. 18, 1980 and to copending application Ser. No. 875,532, filed Feb. 6, 1978, now U.S. Pat. No. 4,224,775 granted Sept. 30, 1980.

BACKGROUND OF THE INVENTION

It is the purpose of this invention to provide an improved roof formed of interlocked panels and panel mounting clips that is structurally sound, economical to manufacture and install, flexible enough to accommodate differential dimensional changes, and thermally efficient when used with an insulation layer and thermal blocks.

The invention accomplishes this purpose by means of an improved seamed roof and panel clip structure composed of substantially identical panels of a design in which opposite sidewalls have flanges shaped to nest together and interlock with each other and with panel mounting clips fastened to the roof purlins. In preferred form the mounting clips include a base that is fastened to the purlin and a flexible tab clip that interlocks with the panel sidewalls and is secured to the base in a manner that permits it to move relatively to it in order to accommodate movement of the panels relative to the purlins while maintaining their attachment to them. If roof insulation is desired, blankets of insulation can be laid across the roof purlins and the panels and panel mounting clips laid on top of the insulation. Preferably, the insulation includes relatively stiff thermal blocks that are laid over the blanket insulation directly above the purlins and extend between the panel mounting clips. The panels are laid upon and supported by the thermal blocks thereby allowing the insulative blankets to be substantially fully expanded to their optimum thickness throughout most of their lengths and the entire roof area to be insulated.

DESCRIPTION OF THE DRAWINGS

FIG. 4 is an enlarged cross section along the line 4—4 of FIG. 3;

FIG. 5 is a perspective view similar to FIG. 2 but showing an initial step in the installation of a panel;

FIG. 6 is a cross section with parts omitted of adjacent panels in the process of being interlocked, substantially as they appear in FIG. 5, one panel mounting clip being shown in phantom lines to indicate that it is fastened at that position after the panel to which it is to be attached is hinged down to a horizontal position;

FIG. 15 is a perspective view with parts broken away somewhat similar to FIG. 7 but on a smaller scale showing a layer of insulation and vapor barrier layer beneath the panel and panel mounting clip;

FIG. 16 is a view similar to FIG. 15 with a thermal block added;

FIG. 17 is a perspective view of the panel clip mounted on a purlin over a layer of insulation and vapor barrier;

FIG. 18 is a perspective view of a portion of a roof installation generally similar to FIG. 2 but showing thermal blocks and insulating layer; and FIG. 19 is a cross section through one joint of a roof structure prior to seaming, similar to that of FIG. 6 but on a larger scale and with insulating layer and thermal blocks.

DESCRIPTION OF THE INVENTION

Figure 1:
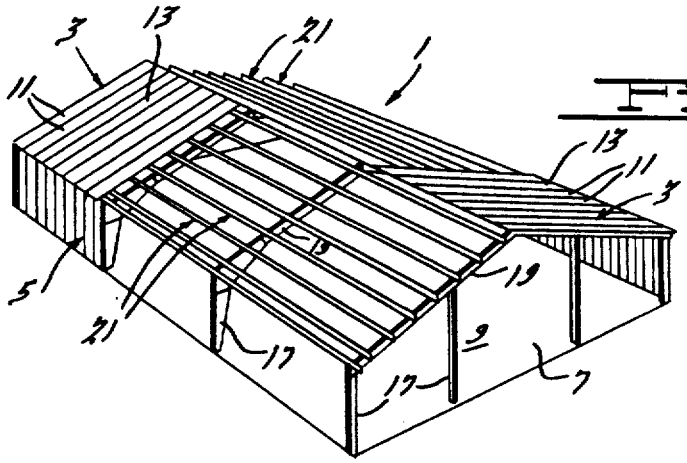
FIG. 1 is a simplified perspective view of a building in the process of construction showing an environment in which a roof structure embodying the invention may be utilized.
Figure 2:
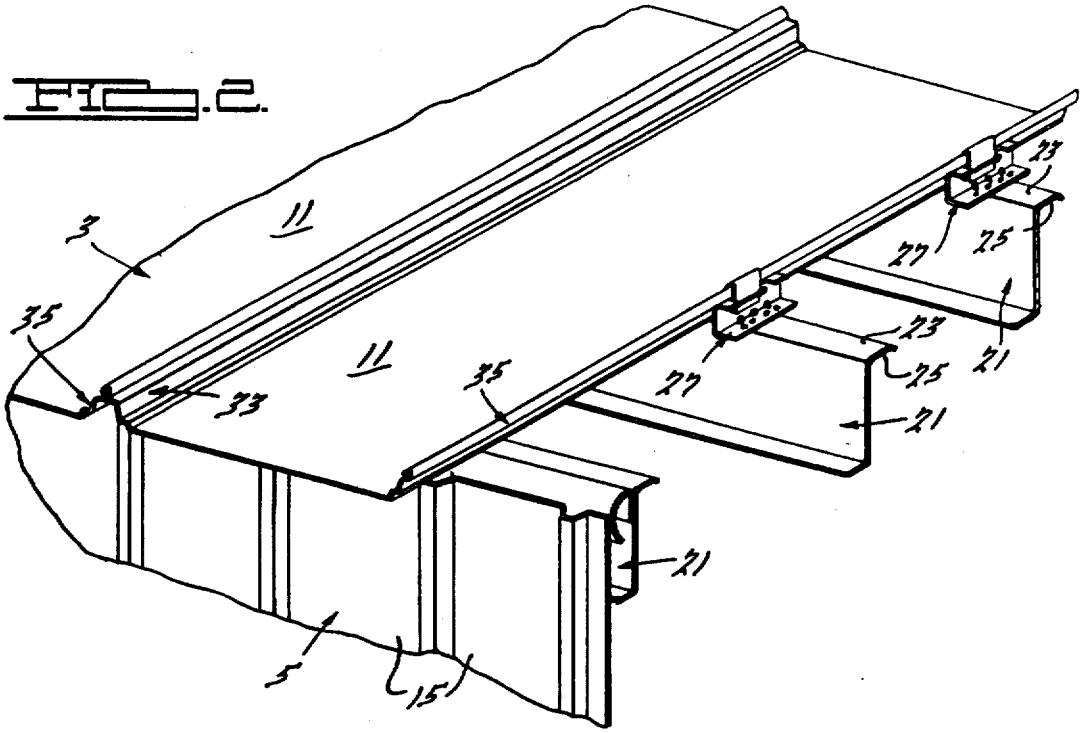
FIG. 2 is a broken away perspective view, on an enlarged scale as compared with FIG. 1, showing roofing panels according to the invention installed on the roof of a building such as FIG. 1 in course of construction.
Figure 3:
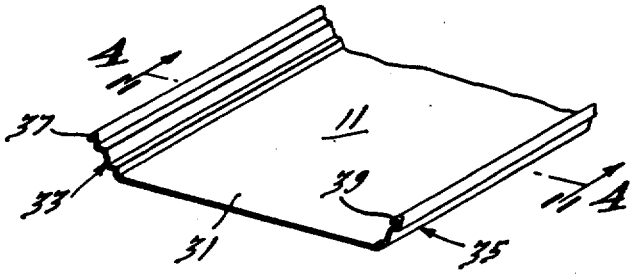
FIG. 3 is a fragmentary perspective view of a roof panel constructed in accordance with the invention viewed from one end and above.
Figure 7:
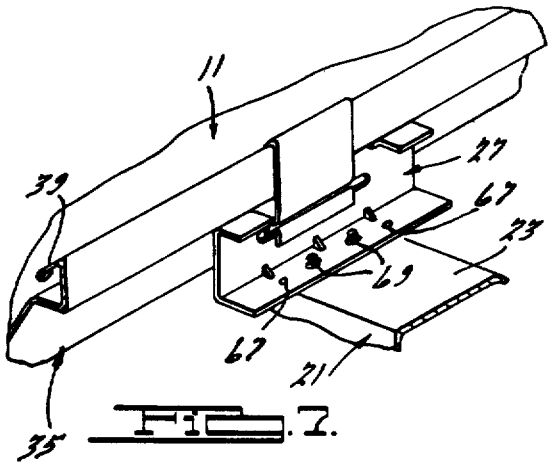
FIG. 7 is a broken away perspective view similar to FIG. 2 but on a larger scale, showing a panel mounting clip and adjacent portions of a panel and purlin.

FIG. 1 shows a building 1 with a low profile roof structure 3, sidewalls 5, an end 7, and a floor 9. In accordance with the present invention, the roof structure comprises a large number of substantially identical elongated metal panels 11 laid side by side and seamed together so that each side 13 of the roof becomes substantially a one piece membrane formed of a series of integrated panels. The sidewalls 5 are illustrated as consisting of panels 15 erected side by side and which are secured together in any suitable manner. It will be appreciated that various sidewall constructions can be used with the roof structure 3 of this invention. It is preferable, however, that the sidewalls be erected prior to the roof structure since, as seen best in FIG. 2, the overhang of previously installed roof panels 11 would interfere with erection of the sidewall panels 15.

The building 1 has any suitable framework, such as frame columns and vertical members 17 that support the inclined transverse roof rafter beams 19. The beams 19 support the horizontal longitudinal purlins or purlins 21 of the roof structure. The top surfaces 23 of the upper purlin flanges 25 define roof planes for the roof sections 13 that are flat and accurately rectangular and they support the roof panels 11 and roof panel mounting clips 27.

In accordance with the invention, the roof panels have a special cross sectional configuration which not only strengthens them but enables adjacent panels to be movably interlocked or hinged and, later, to be tightly joined together in a common mechanical seam. The mechanical interlocks between adjacent panels in conjunction with the clips 27 hold them substantially in place while the remaining panels are being run and until seaming can be finished thereby minimizing the possibility of their disruption due to gusts of wind, etc.

Each panel 11 comprises a central bottom portion 31 which may be flat, as shown, or reinforced in a suitable way such as by a series of transverse embossed ribs (not shown) pressed into it. The panel has opposite sidewalls 33 and 35 extending upwardly and outwardly from the bottom 31 at angles of substantially 60° to the horizontal. The sidewalls 33 and 35 are substantially mirror images of each other, except for top flanges 37 and 39, respectively, and like features are therefore given the same reference numbers. Thus, the sidewalls 33 and 35 include outwardly slanted vertical bottom wall sections 41 having top ends which are joined by horizontal shelf sections 43 to the bottom ends of outwardly slanted, vertical, intermediate wall sections 45. Horizontal rims 47 extend outwardly from the top ends of the wall sections 45 and terminate at the bottom ends of seaming ribs 49 and 51 that form upper panel sections that extend, preferably, at right angles to a plane defined by the bottom wall 31. Ribs 49 are slightly higher than the ribs 51 so that flanges 37 will fit over the tops of flanges 39.

The top flange 37 extends outwardly from the top of its rib 49 at an angle of substantially 60° to it (about 30° to the horizontal or plane of bottom 31); and the top flange 39 extends inwardly from the top of its rib 51 at an angle of substantially 60° to it. The top flange 37 is a little wider than flange 39 and has an inner surface 53 and an outer section or lip 55 that extends inwardly and downwardly at an angle of substantially 60° to the flange 37 (about 30° to the horizontal) for a distance substantially as indicated by the dimensional relationship shown in FIGS. 13 and 19, so that a part of it will be vertically below a flange 39 after installation. The top flange 39 has an inner surface 57 and extends inwardly and downwardly toward bottom 31 at an angle of substantially 60° to its rib (about 30° to the horizontal) and an end section 59 that is doubled back toward rib 51 to form a reversely bent bulb-like end edge portion for the flange 39. It will be noted that suitable radii are provided at the various corners and bends and that the panels 11 are of a shape that can be roll formed from sheet metal in accordance with known methods and using roll stand equipment that is commercially available.

Referring to the panel mounting clip 27, best illustrated in FIGS. 7-10, the construction of this member enables it to assist in holding the panels 11 in place after they are laid. It includes means to permit the panels to expand and contract relative to the purlins 21 in response to temperature differentials and changes during the life of the roof thereby minimizing temperature induced roof stressing. The panel mounting clip 27 is preferably formed of sheet metal and comprises a base member generally designated 63 having a horizontal bottom flange 65 that has four openings 67 in it whereby the clip may receive screw fasteners or the like 69 for attaching it to the top flange 25 of a purlin 21 or other support. The base member is proportioned to fit in the tunnel defined by the sloping sidewalls 33 and 35 of adjacent panels. The member 63 has a vertical column web 71 and several gussets 73 may be pressed in it and in the bottom flange 65 at the corner between the web 71 and the flange 65 to provide rigidity to the bottom end of the clip 27. Base member 63 has top flanges parallel to the bottom flange 65 including a central flange section 75 which is bent to extend in the opposite direction from bottom flange 65 and a pair of top end flange sections 77 on either side of the top flange 75 at the opposite ends of the member 63 and which extend in the same direction as the bottom flange 65 and are parallel to it. The flanges 75 and 77 provide shelves which fit beneath the rims 47 of the panels 11 to provide means on which they may be supported if their weight is not carried directly by the purlins.

Figure 8:
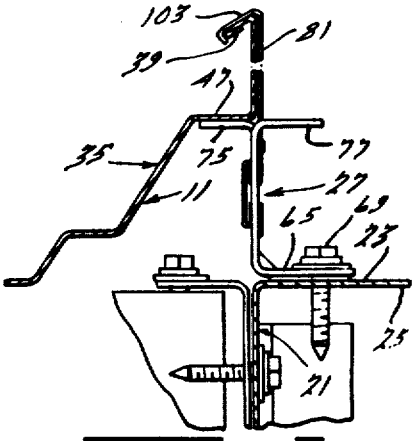
FIG. 8 is an enlarged cross section through one side of a typical panel with a panel mounting clip attached to it and mounted in a typical manner at a roof edge position.
Figure 9:
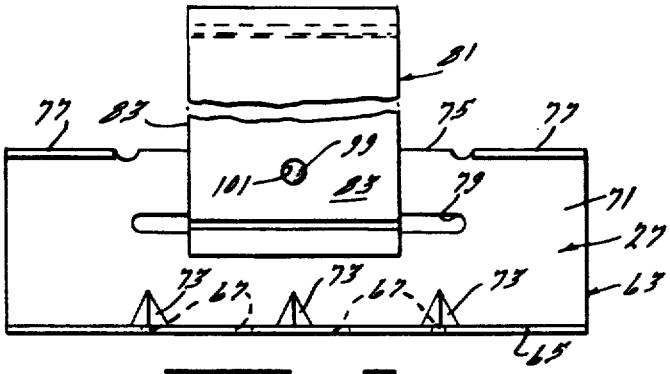
FIG. 9 is an enlarged side elevation, broken away, of the panel mounting clip shown in previous FIGS.
Figure 10:
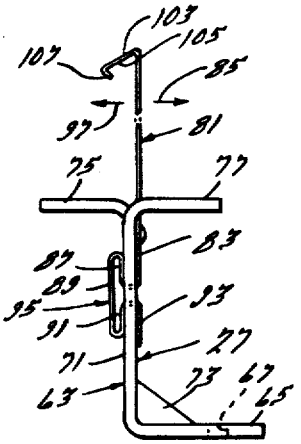
FIG. 10 is an end elevation of the clip shown in FIG. 9.

The web 27 has a horizontal slot 79 extending through it which is substantially coextensive with the flange 75. A holding tab member 81 is mounted on the web 71 and engaged in the slot 79 and is capable of sliding movement from one end of the slot to the other. Tab 81 is preferably formed of thinner metal than is the base member 63 and is somewhat resilient so that its vertical web portion 83 is biased toward the surface of web 71 but can also move transversely away from it in the direction of the arrow 85 (see FIG. 10). The bottom of the tab clip has a special resilient loop, the general configuration of which corresponds in cross section to the capital letter omega with its loop somewhat flattened. The hook-like reverse bend portion 87 so defined extends upwardly after passing through the slot 79 and the loop is shaped to press against the back of the web 71 just as the bottom of the web 83 presses against the front side of web 71. The hook-like portion underengages the top of slot 79 and opposes upward movement of tab 81. The clip metal is reversely bent downwardly in loop section 89 that extends to below the bottom of the slot 79 for a distance substantially equal to the length of the reverse bend section 87. The section 89 is then reversely bent into a hooked section 91 corresponding to section 87 which engages the bottom of the slot and the back side of the web 71 and extends through the bottom side of the slot 79 where it is reversely bent downwardly in an end section 93 for the tab clip 81 that engages the inside face of the web 71. The reverse bend sections 87 and 91 together with the section 89 form a resilient loop-like holding means 95 for the tab which clamps it to opposite sides of the web 71 but permits it to slide in the slot 79 between flanges 77. The horizontal spacing of the back loop section 89 from the reverse bends 87 and 91 provides a spring action that tends to hold the tab clip 81 in a vertical position as shown in FIGS. 8 and 10 but also enables it to be moved away from the web 71 in the direction of arrow 85. Since the tab clip 81 is relatively thin it can also be bent resiliently to some extent in the direction of the arrow 97.

While the tab clip 81 is capable of longitudinal movement with respect to the base member 63 it does have a center position along the midline of the member 27 and is yieldably held in this position by means of a dimple 99 that is embossed in the web 71 and adapted to seat in a hole 101 formed in the tab web 83. Substantial force tending to move the clip 81 in one direction or another along the slot 79 will overcome the spring pressure of the holding section 95 and enable the web 83 to ride over the dimple 99.

Figure 12:
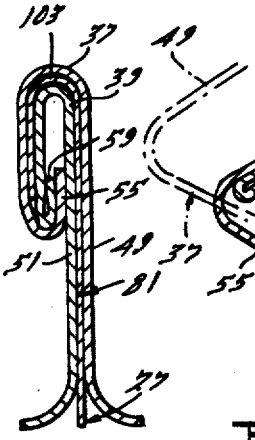
FIG. 12 is a cross section of the joint of FIG. 11 after seaming.
Figure 13:
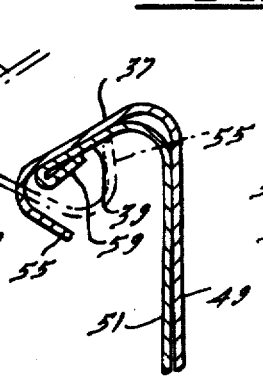
FIG. 13 is a cross section through a panel to panel joint prior to seaming.
Figure 14:
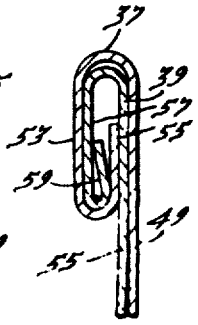
FIG. 14 is a cross section through the joint of FIG. 13 after seaming.

The top end of the tab clip 81 has a hook-like flange 103 which is very similar to panel flange 37. Thus, it has a section 105 that extends outwardly and downwardly at an angle of substantially 60° to the section 81 and ends in a lip flange 107. The height of the flange 103 above the plane of the top surfaces of flanges 75 and 77 is a little more than that of a flange 39 above a rim 47. The transverse length of the flange 103 is also a little more than that of flange 39. The flange dimensional relationships enable flanges 103 to snugly fit over and hook on to flanges 39 and the panel flanges 37 to fit over, hinge around, and hook on to the combined flanges 39 and 103 (FIGS. 11–12) as well as single flanges 39 (FIGS. 13 and 14).

Referring to FIGS. 15–19, the structure already described is insulated. This is done by use of a layer 121 of compressible blanket insulation beneath the panels 11 and a plurality of thermal blocks or bars 123 that are substantially incompressible and located over the purlin runs. In FIGS. 15–17 a vapor barrier sheet 125 is shown beneath the blanket insulation 121. As will become apparent, in using insulation the panel clips 27' are modified slightly so that the distance between the slot 79' and flange 65' is increased over that used with previous clip 27. This is required to accommodate substantially the thickness of thermal bars 123. Other than this change (and tangs 126) the structures are substantially the same as previously described and, accordingly, the same reference numbers are used with primed numerals designating portions of the clip assembly.

It will be understood that layers of blanket insulation 121 from rolls are simply laid across the tops of the purlins 21 with an interposed vapor barrier as 125 if desired, before installation of the panels 11. The panel mounting clips 27' may be placed over the insulating layer and fastened to a purlin 21 by extending fasteners 69 through the openings 67' in the bottom flanges 65' and then through the insulation into the purlin 21 as seen in FIG. 19 and as assumed in FIGS. 15 and 16. When attached to the purlins 21, the tabs 81' of mounting clips 27' are in positions to hold the panels 11 in place over the insulating layer 121.

Preferably, the thermal blocks or bars 123 have a width of their bottom faces which is about the same as the width of the pulin surface 23. They are laid on top of the insulation over the purlins to extend between each pair defined by the sequential panel chips 27' which are spaced along the purlins conformably to the width of the panels. The panel clips may have triangular pointed barbs or tangs 126 bent out at right angles from webs 71' to penetrate into a butt end of each bar 123 and help to mechanically hold them in place until the panels 11 are laid on top of them. The side faces of the thermal bars 123 are preferably tapered on an angle of about 45°, as seen at 127, to facilitate expansion of the insulative material in the blanket 121 to its full thickness. The thermal bars 123 may be formed of suitable material having strength as well as insulative properties, such as urethane foam or high density styrofoam. Although in FIG. 19, the ends of the bars 123 are shown as notched out at 129 to accommodate the heads of the bolts 69 and thereby extend closely adjacent to the webs 71' of the panel mounting clips 27', in practice it has been found that notching the blocks is not required and the foamed material can simply be deformed over the fastener heads during installation.

When the panels 11 are laid and held in place by the panel mounting clips 27', the bottoms 31 thereof will rest on the tops of the bars 123. Thus, their weight is transmitted through the bars 123 and through the blanket insulation into the purlins 21 thereby compressing the insulation to a small fraction of its normal thickness, as seen at 131. Because of the beveled side faces 127, the blanket insulation is quick to rebound to its maximum thickness and this feature plus the insulative quality of the thermal bars 123 provide a substantially continuous and efficient insulative layer over the entire surface of the roof section 13 to which the insulation is applied.

Since the bottom 31 of each panel is prevented from contacting the top surface 23 of the purlin by the thickness of the thermal bars 23 and the insulation section 131 but the panel clip 27' is only separated from the surface 23 by the insulation section 131, it is necessary to increase the height of the web 71' as compared with the panel clip 27 and its web 71. This is apparent upon consideration of FIG. 19. This figure also shows that in other respects the structure of the insulated roof revealed in FIGS. 15–19 is substantially the same as the uninsulated roof of FIGS. 1–8.

In practical application of the invention, the framework of the building 1 is first erected followed by the sidewalls 5. After this is done, the panels 11 may be laid on the purlins 21 starting from the left and moving toward the right end of the roof section 13. Ignoring special procedures known to those in the art for handling the structure at the ends of the roof section, a panel 11 is laid across the purlins 21 and may be allowed to rest there (or in insulation 121) under the force of gravity and resistance of friction. After a panel 11 is thus laid on the purlins 21, the panel mounting clips 27 are lined up with the right side wall 35 of the panel so that the flanges 75 fit under the rim 47, the tab clip 81 abuts the upper section 51, and the top flange 103 and hook lip 107 extend over and around the flange 39 on the sidewall 35. The actual connection can be made by hooking the flange 103 (or 103') on the flange 39 and hinging the clip 27 around to the vertical position indicated. When this is done, holes are drilled in the purlin flange 23 in alignment with the holes 67 in the bottom flange 65 of the panel clip 27. Screws 69 are then threaded into these holes in the purlin to thereby firmly anchor the panel clips to the purlin. This, of course, also anchors the side wall 35 of the panel 11 to the purlin so that it cannot more upwardly away from it.

Figure 11:
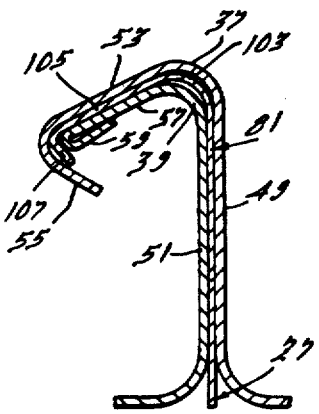
FIG. 11 is a cross section through the seaming area of a panel-panel mounting clip-panel joint prior to seaming.

As seen best in FIGS. 5 and 6, the next step in the assembly procedure is to attach another panel 11 in side by side relationship to the panel that has just been anchored in place by panel mounting clips 27. This is done by interconnecting the side wall 33 of the second panel to the side wall 35 of the first and anchored panel. More particularly, it is done by placing the flange 37 over and around the flange 39 so that the stationary flange 39 is nested inside of the flange 37. This interconnection is accomplished by tilting the panel 11 that is being attached at an angle to the horizontal so that the reentrant hooked lip edge 55 can fit in the corner of the flange 39 as shown by the phantom lines in FIG. 13. When this relationship has been accomplished between the flange 37 and the flange 39, the panel 11 can be hinged in a clockwise manner until its bottom 31 comes to rest against the surfaces 23 on the purlins 21 or against the thermal bars 123. At this point the relationship between the flanges 37 and 39 will be substantially as shown in full lines in FIG. 13 in the cross sections where there is no panel clip 27 and substantially as shown in FIG. 11 where there is a panel mounting clip 27. It will be seen that the lip 55 on the flange 37 lies vertically below the rebent end 59 of the flange 37 and consequently the two panels are interconnected in such a way that it is quite difficult to separate them by simple movements of one relative to the other such as might be caused by wind gusts, etc. It is unlikely that the second panel 11 will be disconnected or separated from the anchored panel 11 prior to seaming of the joint between them unless there is also angular unhinging movement of it to unhook its flange 37 from the mating flange 39.

After the second panel 11 has been hooked to and hinged around the anchored panel as just described, panel mounting clips 27 are hooked to its side wall 35 and secured in place by bolts 69 as already described for the first panel. This process of hooking a panel being added to the roof section to one already anchored on the roof section, hinging it down until it rests on the purlins 21, fastening the panel mounting clips 27 to the side wall 35 of the panel and then to the purlin 21, is repeated until all the panels 11 that it is desired to install are in place. It will be noted that in this condition the panel mounting clips 27 together with the loose hook type interlock between flange pairs 37 and 39 will integrate the panels so that they in fact form a unitary though flexible roof structure 13. This flexibility is then materially reduced by running a suitable seaming tool along the upright upper vertical rib sections 49 and 51 to bend the flanges 37 and 39 against the inside face of upper section 51 on side wall 35 to achieve the compressed, interlocked final assembly shown in FIGS. 12 and 14. When this is done the lip 107 of the panel mounting clip tab 81 may in some structures be flattened out, as seen by comparing FIGS. 11 and 12, but this has no undesirable effect since it is apparent that the clip 27 still serves to resist movement of the joint in an upward direction away from the purlins 21. It does have a beneficial effect in that it makes it somewhat easier for tab 81 to move longitudinally relative to the upper sections 49 and 51 of adjacent panels. Such relative movement is, as previously mentioned, accommodated by the slot 79, the spacing between flanges 77, the dimple 99, and the flexible holding means 95 of the panel clip construction 27 and permits differential force systems introduced by temperature changes, pressure changes, etc. between interconnected panels to dissipate themselves in relative movement of the panels rather than in deformation or buckling of the panels. The resiliency of the tabs 81 also permits the interconnected panels 11 to have flexibility as a roof membrane relative to the purlins 21 and structure 17.

While not illustrated, it will be understood that suitable sealant or mastic material, strips or tape can be applied as needed to weatherproof the roof structure.

Thus, the invention provides an improved roof construction that is sound of structure, economical to install, flexible enough to dissipate differential stress systems, and thermally efficient when combined with blanket insulation and thermal blocks.

Predictable, long term thermal characteristics and a minimal heating/cooling load are advantages of the insulated roof structure. Also advantageous is the flexibility provided by the panel mounting clip and panel interlock combination which enables the parts to have some freedom of movement in either direction permitting the roof to respond to seasonal changes and heat or cold by shifting, expanding, or contracting but in a way that tends to keep roof stressing below critical limits to provide a longer roof life.

This detailed description of the preferred embodiments, and the accompanying drawings, have been furnished in compliance with the statutory requirement to set forth the best mode contemplated by the inventor of carrying out the invention. The prior portions consisting of the "Abstract of the Disclosure" and the "Background of the Invention" are furnished without prejudice to comply with administrative requirements of the Patent and Trademark Office.

While preferred embodiments of the invention have been described herein, it will be appreciated that various modifications and changes may be made without departing from the spirit and scope of the appended claims.

I claim:

[1. In a paneling construction adapted to be installed by attachment to spaced parallel structural supporting elements such as the roof purlins of buildings, said construction comprising a plurality of elongated panels laid over and transversely to such supporting elements with the side edges of the panels abutting, said panels having generally planar mid-portions lying close to the supporting elements and having upstanding seaming flanges on said side edges folded over and crimped together to provide a mechanical interlock, each of said panels having supporting portions for said seaming flanges, said supporting portions extending angularly upwardly away from each other and from the mid-portion of the panel whereby the supporting portions of adjacent panels define a tunnel-like area and clip means securing the panels to the structural supporting elements, each clip means including a base member, attaching means rigidly securing said base members and clip means to a structural supporting element in the tunnel-like area defined by the supporting portions of adjacent panels, said construction being characterized by:

A. A rim portion incorporated in an intermediate part of each of the supporting portions of each panel Jl said rim portions lying substantially in a common plane and extending inwardly toward one another from and substantially perpendicularly to the seaming flanges, B. The base member of each of said clip means having an upstanding column with a top portion closely underlying and supporting said rim portions of the adjacent panels, C. A holding portion secured to the base member of each clip means and preventing outward movement of the holding portion, said holding portions projecting upwardly from the base member between, and being folded over and crimped together with, the seaming flanges of the adjacent panels to prevent relative movement therebetween, whereby said holding portion and the top portion of the base member co-act with the seaming flanges and with said attaching means to prevent movement of the seaming flanges and of the supporting portions of the panels toward and away from the structural supporting elements and also to hold the holding portion against movement toward the base member.]

2. [2. A paneling construction as defined in claim 1] *In a paneling construction adapted to be installed by attachment to spaced parallel structural supporting elements such as the roof purlins of buildings, said construction comprising a plurality of elongated panels laid over and transversely to such supporting elements with the side edges of the panels abutting, said panels having generally planar mid-portions lying close to the supporting elements and having upstanding seaming flanges on said side edges folded over and crimped together to provide a mechanical interlock, each of said panels having supporting portions for said seaming flanges, said supporting portions extending angularly upwardly away from each other and from the mid-portion of the panel whereby the supporting portions of adjacent panels define a tunnel-like area and clip means securing the panels to the structural supporting elements, each clip means including a base member, attaching means rigidly securing said base members and clip means to a structural supporting element in the tunnel-like area defined by the supporting portions of adjacent panels, said construction being characterized by:*

*A. A rim portion incorporated in an intermediate part of each of the supporting portions of each panel, said rim portions lying substantially in a common plane and extending inwardly toward one another from and substantially perpendicularly to the seaming flanges,*

*B. The base member of each of said clip means having an upstanding column with a top portion closely underlying and supporting said rim portions of the adjacent panels,*

*C. A holding portion secured to the base member of each clip means and preventing outward movement of the holding portion, said holding portions projecting upwardly from the base member between, and being folded over and crimped together with, the seaming flanges of the adjacent panels to prevent relative movement therebetween, whereby said holding portion and the top portion of the base member co-act with the seaming flanges and with said attaching means to prevent movement of the seaming flanges and of the supporting portions of the panels toward and away from the structural supporting elements and also to hold the holding portion against movement toward the base member, and* wherein the column of the base member comprises a flat upstanding column web having a slot therein extending lengthwise thereof, the holding portion comprising a sheet metal member having a holding web lying beside and projecting upwardly above said column web, a part of said holding web at its lower end being slidably interengaged with the upper edge of said slot to prevent upward movement of said holding web, and a resiliently deflectable portion carried by said holding web yieldably slidably engaging the lower edge of said slot.

[3. A paneling construction as defined in claim 2, wherein said base member comprises a sheet metal member having a bottom flange for securance to the structural supporting element, a flat upstanding web defining said column web, and top flange extending from both sides of said column web and defining said top portion.]

4. A paneling construction as defined in claim 2 wherein said holding web lies flat against one side of the column web and extends above and below the slot, a portion of the holding web extending through the slot and being formed on the other side of the column web as a loop extending above and below the slot and having the general cross section of the capital letter omega and defining a hook constituting said part which prevents upward movement, and defining a second hook which constitutes said deflectable portion.

5. A paneling construction as defined in claim 4 wherein said loop is of flattened configuration and the loop and said holding web bear frictionally against opposite sides of said column web.

* * * * *

UNITED STATES PATENT AND TRADEMARK OFFICE

CERTIFICATE OF CORRECTION

PATENT NO. : RE. 33,566

DATED : April 9, 1991

INVENTOR(S) : Robert E. Heckelsberg

It is certified that error appears in the above-identified patent and that said Letters Patent is hereby corrected as shown below:

Column 3, line 55, after "rib" insert --51--.

Column 5, line 51, "of" should be --on--.

Column 8, line 45, Claim 1, after "panel" delete "J1".

Column 8, line 45, Claim 1, after "panel" insert --,--.

Column 9, line 37, Claim 2, begin new paragraph with "whereby".

Column 10, line 17, Claim 3, "2" should be --1--.

Column 10, line 21, Claim 3, "flange" should be --flanges--.

Signed and Sealed this

Sixth Day of April, 1993

*Attest:*

STEPHEN G. KUNIN

*Attesting Officer*

*Acting Commissioner of Patents and Trademarks*